United States Patent
Hsiao

(10) Patent No.: US 8,392,034 B2
(45) Date of Patent: Mar. 5, 2013

(54) ELECTRONIC APPARATUS HAVING COOLING FAN AND DETACHABLE AIR FILTER AND CONTROL METHOD OF COOLING FAN THEREOF

(75) Inventor: Chi-Hung Hsiao, Taoyuan (TW)

(73) Assignee: Qisda Corporation, Taoyuan County (TW)

( * ) Notice: Subject to any disclaimer, the term of this patent is extended or adjusted under 35 U.S.C. 154(b) by 226 days.

(21) Appl. No.: 12/969,560

(22) Filed: Dec. 15, 2010

(65) Prior Publication Data

US 2011/0144826 A1 Jun. 16, 2011

(30) Foreign Application Priority Data

Dec. 16, 2009 (TW) ................................ 98143033 A

(51) Int. Cl.
*G05D 23/00* (2006.01)
*G06F 1/20* (2006.01)
*H05K 5/00* (2006.01)
*H05K 7/20* (2006.01)
*G03B 21/18* (2006.01)
*G03B 21/26* (2006.01)
*G08B 21/00* (2006.01)

(52) U.S. Cl. ............... 700/300; 361/679.48; 361/695; 353/57; 340/607; 165/289

(58) Field of Classification Search ............... 700/299, 700/300; 361/600, 679.01, 679.46, 679.48, 361/679.54, 679.6, 688–690, 692, 694, 695; 353/52, 57; 340/500, 540, 603, 606–608; 165/287–289

See application file for complete search history.

(56) References Cited

U.S. PATENT DOCUMENTS

| | | | | |
|---|---|---|---|---|
| 5,102,040 A | * | 4/1992 | Harvey | 236/49.3 |
| 5,796,580 A | * | 8/1998 | Komatsu et al. | 361/679.48 |
| 6,319,114 B1 | * | 11/2001 | Nair et al. | 454/184 |
| 6,507,282 B1 | * | 1/2003 | Sherwood | 340/607 |
| 7,261,762 B2 | * | 8/2007 | Kang et al. | 95/1 |
| 8,142,027 B2 | * | 3/2012 | Sakai | 353/52 |
| 2005/0201056 A1 | * | 9/2005 | Lin | 361/695 |
| 2007/0217920 A1 | * | 9/2007 | Aoyama | 417/63 |
| 2009/0009729 A1 | | 1/2009 | Sakai | |
| 2011/0027137 A1 | * | 2/2011 | Kim et al. | 422/186.3 |

FOREIGN PATENT DOCUMENTS

| | | | | |
|---|---|---|---|---|
| CN | 101424949 A | | | 5/2009 |
| JP | 03063430 A | * | | 3/1991 |
| JP | 03191227 A | * | | 8/1991 |
| JP | 2005083660 A | * | | 3/2005 |
| JP | 2007073707 A | * | | 3/2007 |
| JP | 2008262033 A | * | | 10/2008 |

OTHER PUBLICATIONS

Office action of counterpart application cited by China Patent Office on Feb. 25, 2011.

* cited by examiner

*Primary Examiner* — Crystal J Barnes-Bullock

(57) ABSTRACT

The invention provides an electronic apparatus including a casing, a thermal sensor, a controlling unit, an air filter and a cooling fan. The air filter is detachably attached to the inlet of the casing. When the air filter is attached to the inlet of the casing, a partial structure of the air filter neighboring the thermal sensor blocks an airflow from flowing through the thermal sensor. In particular, when the air filter is attached to the inlet of the casing, or when the air filter is not attached to the inlet of the casing, the controlling unit always calculates a determined speed by applying the temperature sensed by the thermal sensor in a function of speed versus temperature, and controls the cooling fan operating under the determined speed to cool the electronic apparatus.

8 Claims, 5 Drawing Sheets

|  | Is the air filter attached? | $T_a(^0C)$ | $T_1(^0C)$ | Fan speed (rpm) | $T_{sys}(^0C)$ | Noise (dBA) |
|---|---|---|---|---|---|---|
| original function applied to conventional air filter | No | <25 | <35 | 2000 | 100 | 30 |
| | No | 25 | 35 | 2000 | 100 | 30 |
| | No | 26 | 36 | 2200 | 100 | 31 |
| | Yes | <25 | <35 | 2000 | 103 | 30 |
| modified function applied to conventional air filter | Yes | <25 | <35 | 2200 | 100 | 31 |
| | Yes | 25 | 35 | 2200 | 100 | 31 |
| | Yes | 26 | 36 | 2400 | 100 | 33 |
| original function applied to the air filter according to the invention | Yes | <22 | <35 | 2000 | 100 | 30 |
| | Yes | 22 | 35 | 2000 | 100 | 30 |
| | Yes | 23 | 36 | 2200 | 100 | 31 |

FIG. 4

ELECTRONIC APPARATUS HAVING COOLING FAN AND DETACHABLE AIR FILTER AND CONTROL METHOD OF COOLING FAN THEREOF

CROSS-REFERENCE TO RELATED APPLICATION

This utility application claims priority to Taiwan Application Serial Number 098143033, filed Dec. 16, 2009, which is incorporated herein by reference.

BACKGROUND OF THE INVENTION

1. Field of the Invention

The present invention relates to an electronic apparatus having a cooling fan and a detachable air filter and, more particularly, when the air filter is attached to the electronic apparatus, or when the air filter is not attached to the electronic apparatus, the electronic apparatus according to the invention controls the cooling fan operating according to the same function of speed versus temperature, and cools the electronic apparatus effectively.

2. Description of the Prior Art

Present electronic apparatuses such as projectors, rear-projection TV sets, CD-ROM drives, and computers, have interior components generating heat during operation. Therefore, these electronic apparatuses all need to be equipped with cooling fans to cool its interior.

For optimizing the cooling performance inside the electronic apparatus, certain electronic apparatuses equipping with cooling fans store functions of fan speed versus temperature, and sense interior temperatures. The electronic apparatuses adjust speeds of their cooling fans according to the sensed interior temperatures and the functions of fan speed versus temperature.

Since the electronic apparatus is in the environment with serious air pollution, for preventing the pollutants from entering the interior of the electronic apparatus to damage its interior components, most of aforesaid electronic apparatuses needing cooling fans also have additional air filters attached to inlets of their casings for stopping the pollutants in the air from entering the interior of the electronic apparatuses. However, the attached air filter would be an obstruction for the airflow flowing into the electronic apparatus. If the original function of fan speed versus temperature is used, the airflow generated by the fan would be not insufficient for cooling the interior of the electronic apparatus, and the electronic apparatus would overheat and be breakdown. Electronic apparatuses equipped with air filters mostly use alternative functions of fan speed versus temperature for effectively cooling the interior of the electronic apparatus. However, such implementation needs memories with more storage capacity and designs of switching to different functions of fan speed versus temperature.

Accordingly, a scope of the invention is to provide an electronic apparatus having a cooling fan and a detachable air filter, and when the air filter is attached to the electronic apparatus, or when the air filter is not attached to the electronic apparatus, the electronic apparatus according to the invention controls the cooling fan operating according to the same function of speed versus temperature, and cools the electronic apparatus effectively

SUMMARY OF THE INVENTION

The electronic apparatus according to a preferred embodiment of the invention includes a casing, a thermal sensor, a controlling unit, an air filter and a cooling fan. The casing has an inlet. The thermal sensor is disposed in the casing. The thermal sensor is used for sensing a temperature relative to an interior of the electronic apparatus according to the invention. The controlling unit is disposed in the casing and electrically connected to the thermal sensor. The controlling unit therein stores a function of speed versus temperature and receives the temperature sensed by the thermal sensor. The air filter is detachably attached to the inlet of the casing. A partial structure of the air filter neighboring the thermal sensor blocks an airflow from flowing through the thermal sensor when the air filter is attached to the inlet of the casing. The cooling fan is disposed in the casing and electrically connected to the controlling unit. Particularly, when the air filter is attached to the inlet of the casing, or when the air filter is not attached to the inlet of the casing, the controlling unit calculates a determined speed by applying the temperature sensed by the thermal sensor in the function of speed versus temperature, and controls the cooling fan operating under the determined speed to cool the electronic apparatus.

In an embodiment, the air filter according to the invention substantially has a first structural density, and the partial structure of the air filter neighboring the thermal sensor has a second structural density. The second structural density is higher than the first structural density.

In an embodiment, the air filter according to the invention includes a main body and a shield portion protruding from the main body. When the air filter is attached to the inlet of the casing, the main body is disposed at the inlet of the casing, and the shield portion of the air filter shields the thermal sensor to block the airflow from flowing through the thermal sensor.

In an embodiment, the air filter according to the invention includes a mesh.

A control method according to a preferred embodiment of the invention is used for controlling a cooling fan of an electronic apparatus. The electronic apparatus also includes a casing and an air filter. The casing has an inlet. The air filter is detachably attached to the inlet of the casing. A partial structure of the air filter neighboring a temperature sensing point in the casing blocks an airflow from flowing through the temperature sensing point when the air filter is attached to the inlet of the casing. A function of speed versus temperature is previously provided. When the air filter is attached to the inlet of the casing, the controlling method according to the invention calculates a first determined speed by applying a temperature sensed at the temperature sensing point in the function of speed versus temperature, and controls the cooling fan operating under the first determined speed to cool the electronic apparatus. When the air filter is not attached to the inlet of the casing, the controlling method according to the invention calculates a second determined speed by applying the temperature sensed at the temperature sensing point in the function of speed versus temperature, and controls the cooling fan operating under the second determined speed to cool the electronic apparatus.

The advantage and spirit of the invention may be understood by the following recitations together with the appended drawings.

BRIEF DESCRIPTION OF THE APPENDED DRAWINGS

FIG. 4 shows test data of a projector of prior art and the projector of the invention using an original function of fan speed versus temperature and an alternative function of fan speed versus temperature.

DETAILED DESCRIPTION OF THE INVENTION

The invention provides an electronic apparatus having a cooling fan and a detachable air filter. The electronic apparatus according to the invention can be a projector, a rear-projection TV set, a CD-ROM drive, or a computer, which needs a cooling fan to cool its interior. With following detailed explanations of the embodiment of a projector according to the invention, the features, spirits, advantages, and feasibility of the invention will be hopefully well described.

Figure 1:
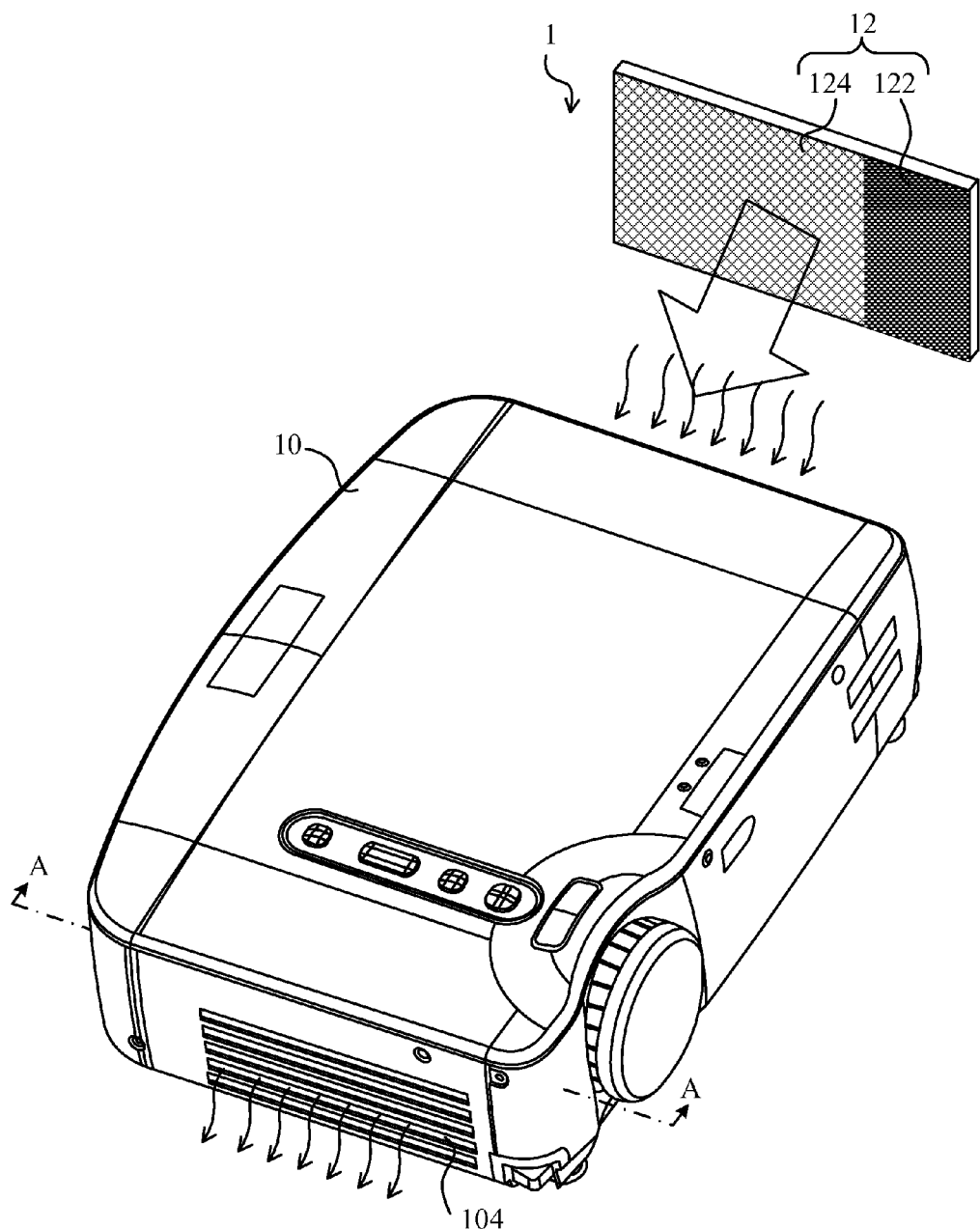
FIG. 1 is a schematic diagram illustrating a projector according to a preferred embodiment of the invention.
Figure 2:
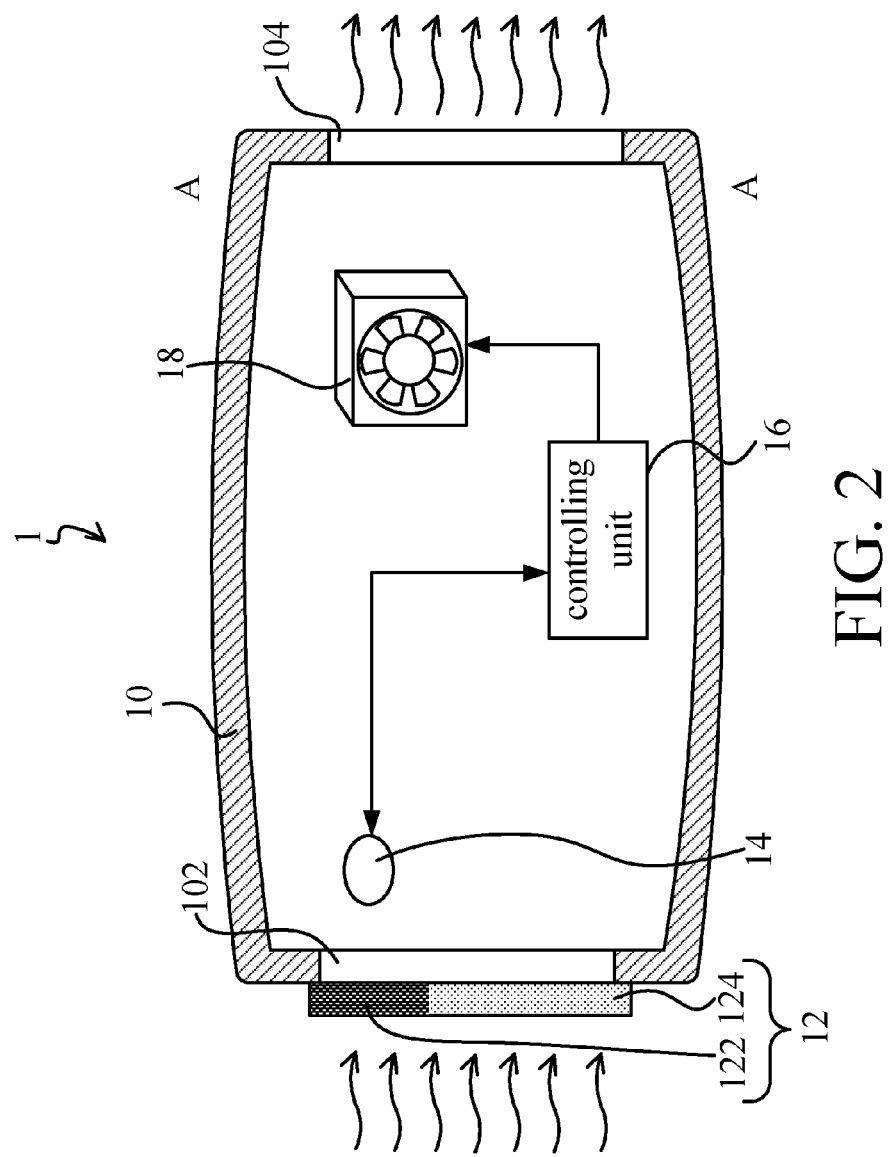
FIG. 2 is a cross-sectional view of the projector along line A-A in FIG. 1.

Please refer to FIG. 1 and FIG. 2. FIG. 1 is a schematic diagram illustrating a projector 1 according to a preferred embodiment of the invention. FIG. 2 is a cross-sectional view of the projector 1 along line A-A in FIG. 1.

As shown in FIG. 1 and FIG. 2, the projector 1 according to the invention includes a casing 10 and a detachable air filter 12. The casing 10 of the projector 1 according to the invention has a inlet 102 and an outlet 104. The airflow goes into the projector 1 from the inlet 102 of the casing 10, and goes out from the outlet 104 of the casing 10. The air filter 12 is detachably attached to the inlet 102 of the casing 10. As to the projector 1 in FIG. 2, the air filter 12 is attached to the inlet 102 of the casing 10. The air filter 12 is used for stopping pollutants in the air from going into the interior of the projector 1.

As well as shown in FIG. 2, the projector 1 according to the invention also includes a thermal sensor 14, a controlling unit 16 and a cooling fan 18. For ease of explanation, other important components of the projector 1 are not shown in FIG. 2. The thermal sensor 14 is disposed in the casing 10, and is used for sensing a temperature relative to an interior of the projector 1 according to the invention. The controlling unit 16 is disposed in the casing 10 and electrically connected to the thermal sensor 10. The controlling unit 16 therein stores a function of speed versus temperature and receives the temperature sensed by the thermal sensor 14. The cooling fan 18 is disposed in the casing 10 and electrically connected to the controlling unit 16.

Different from prior arts, when the air filter 12 is attached to the inlet 102 of the casing 10, or when the air filter 12 is not attached to the inlet 102 of the casing 10, the controlling unit 16 calculates a determined speed by applying the temperature sensed by the thermal sensor 14 in the function of speed versus temperature, and controls the cooling fan 18 operating under the determined speed to cool the electronic apparatus 1.

Particularly, a partial structure 122 of the air filter 12 neighboring the thermal sensor 14 blocks an airflow from flowing through the thermal sensor 14 when the air filter 12 is attached to the inlet 102 of the casing 10.

In an embodiment, as shown in FIG. 2, the air filter 12 according to the invention substantially has a first structural density, which means that the primary structure 124 (exclusive of the partial structure 122) has the first structural density. Besides, the partial structure 122 of the air filter 12 neighboring the thermal sensor 14 has a second structural density. The second structural density is higher than the first structural density. Thereby, the partial structure 122 of the air filter 12 can block the airflow from flowing through the thermal sensor 14. To make the second structural density higher than the first structural density, one can make the partial structure 122 have smaller meshes, or coat the partial structure 122 with glue to clog the partial structure 122. Obviously, the temperature sensed by the thermal sensor 14 is higher without airflow flowing through.

In an embodiment, the air filter 12 includes a mesh.

Figure 3:
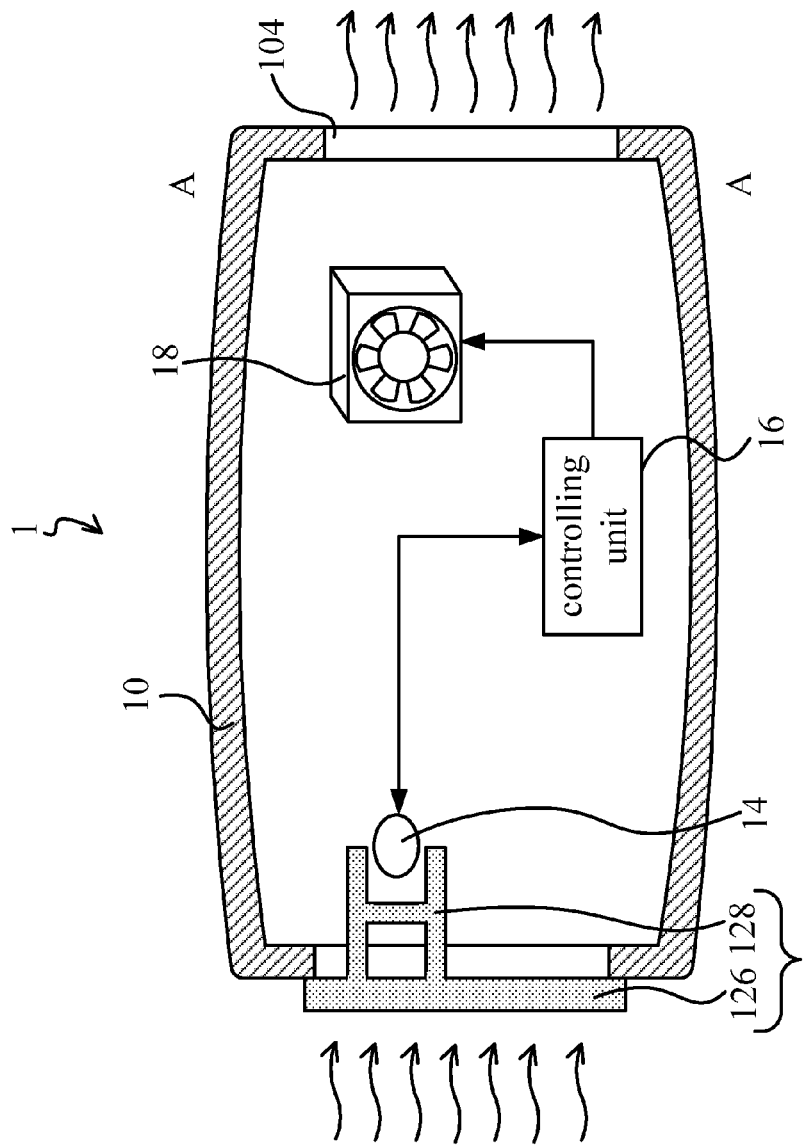
FIG. 3 is another cross-sectional view of the projector along line A-A in FIG. 1

Please refer to FIG. 3. FIG. 3 is also another cross-sectional view of the projector 1 along line A-A in FIG. 1, for illustrating the projector 1 according to another preferred embodiment of the invention. Particularly, the air filter 12 shown in FIG. 3 includes a main body 126 and a shield portion 128 protruding from the main body 126. As shown in FIG. 3, when the air filter 12 is attached to the inlet 102 of the casing 10, the main body 126 is disposed at the inlet 102 of the casing 10, and the shield portion 128 of the air filter 12 shields the thermal sensor 14 to block the airflow from flowing through the thermal sensor 14. Similarly, the temperature sensed by the thermal sensor 14 will be higher without airflow flowing through. The structure and components in FIG. 3 having the same reference numerals as those in FIG. 2 substantially perform the same function as the corresponding structure and components in FIG. 2, which are not described again here With above explanations, it is clearly understood that when the air filter 12 is attached to the inlet 102 of the casing 10, the airflow is blocked from flowing through the thermal sensor 14, and the temperature sensed by the thermal sensor 14 is higher. The advantages and convenience of the design is described below.

Figure 5:
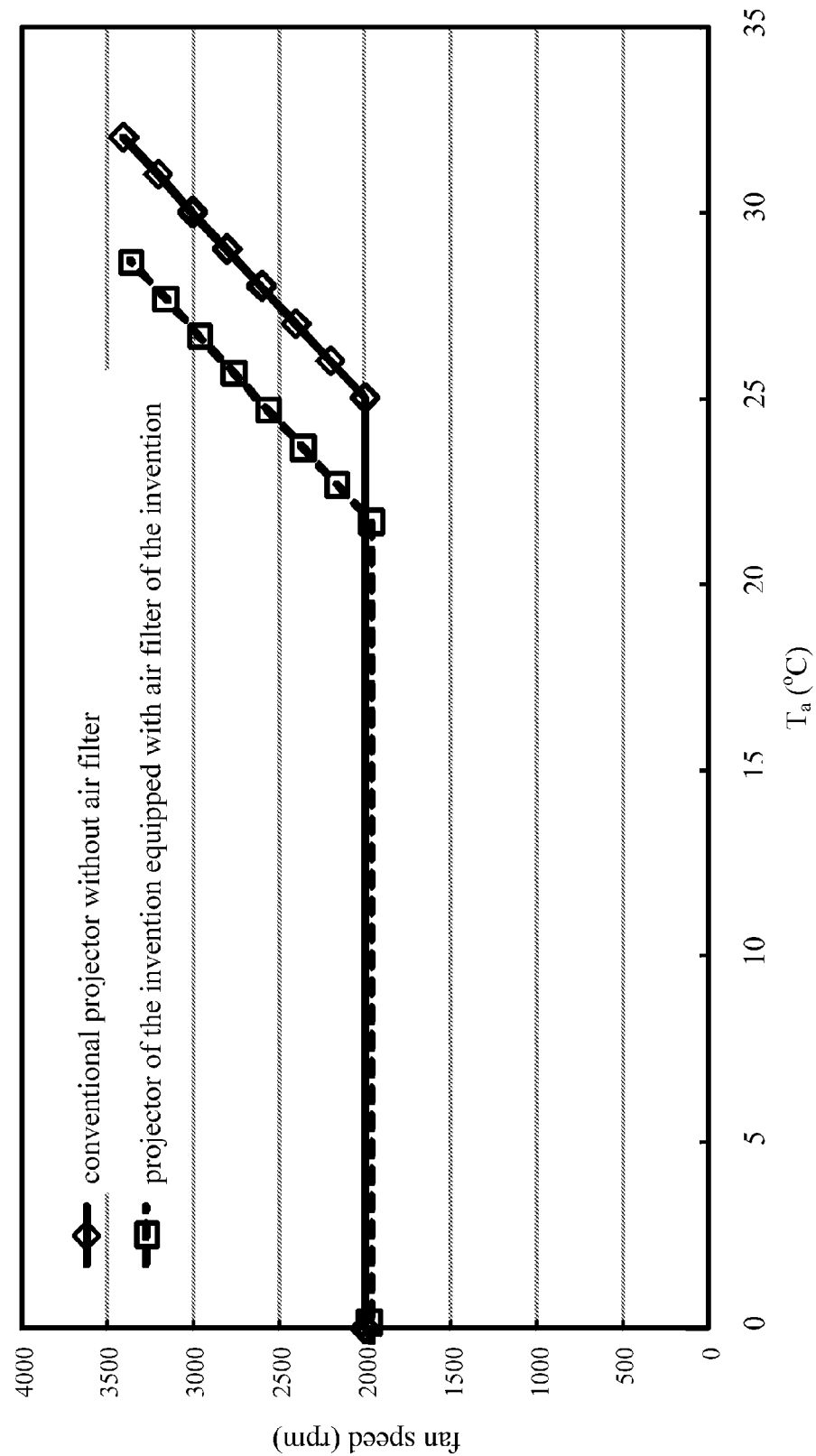
FIG. 5 shows an actual test result of fan speed versus ambient temperature using an original function of fan speed versus temperature for the projector of prior art without an air filter and the projector of the invention using the air filter 12 of the invention.

Please refer to FIG. 4 and FIG. 5. FIG. 4 discloses three sets of data, which are top-down listed below: relative test data regarding a projector of prior art using an original function of fan speed versus temperature, with and without the air filter attached; relative test data regarding a projector of prior art using an air filter of prior art with an alternative function of fan speed versus temperature; relative test data regarding the projector 1 of the invention using the original function of fan speed versus temperature with the air filter 12 of the invention. The test data include ambient temperature $T_a$, temperature $T_1$ sensed by the thermal sensor 14, fan speed, system temperature $T_{sys}$ and noise, etc.

The system temperature $T_{sys}$ rises along with the ambient temperature $T_a$. But it should be understood that system temperature $T_{sys}$ is affected by heat generated by other components and is therefore different from the temperature $T_1$ sensed by the thermal sensor 14. Furthermore, the noise is lauder as the fan speed gets faster. FIG. 5 discloses actual test results of fan speed versus ambient temperature $T_a$ regarding a projector of prior art without an air filter and using an original function of fan speed versus temperature, and the projector 1 of the invention using the air filter 12 of the invention and using the original function of fan speed versus temperature. It is noted that the standard operating temperature limit of projectors used for relative tests of FIG. 4 and FIG. 5 is 100° C., which means that if the system temperature $T_{sys}$ of the projector exceeds 100° C., the projector would overheat and be breakdown or damage the components.

As shown in FIG. 4, when the projector of prior art is not equipped with an air filter and uses an original function, as the ambient temperature $T_a$ is 25° C., the temperature $T_1$ sensed by the thermal sensor 14 is 35° C. According to the original function of fan speed versus temperature, the fan speed only needs to be maintained at 2000 rpm and the system temperature of the project of prior art is maintained at 100° C.; as the ambient temperature $T_a$ is 26° C., the temperature $T_1$ sensed by the thermal sensor 14 is 36° C. According to the original function of fan speed versus temperature, the fan speed only needs to be maintained at 2200 rpm and the system temperature $T_{sys}$ of the project of prior art is still maintained at 100° C. When the projector of prior art is equipped with an air filter and uses the original function, as the ambient temperature $T_a$ is 25° C., the temperature $T_1$ sensed by the thermal sensor 14 is lower than 35° C. According to the original function of fan speed versus temperature, the fan speed only needs to be maintained at 2000 rpm. But the system temperature $T_{sys}$ is already 103° C., and the projector need to use alternative function of fan speed versus temperature to avoid damage of interior components because the system temperature $T_{sys}$ exceeds the standard operating temperature (100° C.).

As well as shown in FIG. 4, when the projector of prior art is equipped with the air filter of prior art and uses alternative function of fan speed versus temperature, as the ambient temperature $T_a$ is 26° C., the temperature $T_1$ sensed by the thermal sensor 14 is 36° C. According to the alternative function of fan speed versus temperature, the fan speed needs to be maintained at 2400 rpm, and the system temperature $T_{sys}$ of the project of prior art can still be maintained at 100° C.

As well as shown in FIG. 4, when the projector 1 of the invention is equipped with the air filter 12 and uses an original function of fan speed versus temperature, as the ambient temperature $T_a$ is 23° C., by using the air filter 12 to block the airflow from flowing through the thermal sensor 14, the temperature $T_1$ sensed by the thermal sensor 14 is 36° C. According to the original function of fan speed versus temperature, the fan speed needs to be maintained at 2200 rpm to make the system temperature $T_{sys}$ of the project 1 maintained at 100° C.

As shown in FIG. 5, as well as using the original function of fan speed versus temperature, compared with the projector of prior art without air filter, when the air filter 12 of the invention is attached to the inlet 102 of the casing 10, the airflow is blocked from flowing through the thermal sensor 14, such that the temperature $T_1$ sensed by the thermal sensor 14 can be higher even the ambient temperature $T_a$ of the projector 1 of the invention is lower. Therefore, according to the original function of fan speed versus temperature, when the ambient temperature $T_a$ of the projector 1 of the invention is at a lower ambient temperature $T_a$ (23° C.), the fan speed is accelerated to 2200 rpm to maintain the system temperature $T_{sys}$ of the projector 1 at 100° C.

Furthermore, a control method according to a preferred embodiment of the invention is used for controlling a cooling fan of an electronic apparatus. A function of speed versus temperature is previously provided. The electronic apparatus also includes a casing and an air filter. The casing has an inlet. A partial structure of the air filter neighboring a temperature sensing point in the casing blocks an airflow from flowing through the temperature sensing point when the air filter is attached to the inlet of the casing. The structure and embodiment of the air filter is as described above and is not mentioned here again.

When the air filter is attached to the inlet of the casing, the controlling method according to the invention calculates a first determined speed by applying a temperature sensed at the temperature sensing point in the function of speed versus temperature, and controls the cooling fan operating under the first determined speed to cool the electronic apparatus.

When the air filter is not attached to the inlet of the casing, the controlling method according to the invention calculates a second determined speed by applying the temperature sensed at the temperature sensing point in the function of speed versus temperature, and controls the cooling fan operating under the second determined speed to cool the electronic apparatus.

With above detailed description of the projector embodied according to the invention, it can be easily understood that the invention can also be embodied in the electronic apparatuses having cooling fan and detachable air filter such as projectors, rear-projection TV sets, CD-ROM drives, and computers, etc. It can also be understood that different from the prior art using two sets of functions of fan speed versus temperature, the invention needs to use only one set of functions of fan speed versus temperature, and no matter the air filter is or is not attached to the electronic apparatus, the electronic apparatus according to the invention controls the cooling fan operating according to the same function of fan speed versus temperature, and effectively cools the interior of the electronic apparatus.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An electronic apparatus, comprising:
a casing having an inlet;
a thermal sensor, disposed in the casing, for sensing a temperature relative to an interior of said electronic apparatus;
a controlling unit, disposed in the casing and electrically connected to the thermal sensor, the controlling unit therein storing a function of speed versus temperature and receiving the temperature sensed by the thermal sensor;
an air filter, detachably attached to the inlet of the casing, a partial structure of the air filter neighboring the thermal sensor blocking an airflow from flowing through the thermal sensor when the air filter is attached to the inlet of the casing; and
a cooling fan, disposed in the casing and electrically connected to the controlling unit, wherein when the air filter is attached to the inlet of the casing, and when the air filter is not attached to the inlet of the casing, the controlling unit calculates a determined speed by applying the temperature sensed by the thermal sensor in the function of speed versus temperature, and controls the cooling fan operating under the determined speed to cool said electronic apparatus.

2. The electronic apparatus of claim 1, wherein the air filter substantially has a first structural density, the partial structure of the air filter neighboring the thermal sensor has a second structural density, and the second structural density is higher than the first structural density.

3. The electronic apparatus of claim 1, wherein the air filter comprises a main body and a shield portion protruding from the main body, when the air filter is attached to the inlet of the casing, the main body is disposed at the inlet of the casing, and the shield portion of the air filter shields the thermal sensor to block the airflow from flowing through the thermal sensor.

4. The electronic apparatus of claim 1, wherein the air filter comprises a mesh.

5. A control method for controlling a cooling fan of an electronic apparatus, said electronic apparatus also comprising a casing and an air filter, the casing having an inlet, the air filter being detachably attached to the inlet of the casing, a partial structure of the air filter neighboring a temperature sensing point in the casing blocking an airflow from flowing through the temperature sensing point when the air filter is attached to the inlet of the casing, a function of speed versus temperature being previously provided, said method comprising the steps of:

when the air filter is attached to the inlet of the casing, calculating a first determined speed by applying a temperature sensed at the temperature sensing point in the function of speed versus temperature, and controlling the cooling fan operating under the first determined speed to cool said electronic apparatus; and when the air filter is not attached to the inlet of the casing, calculating a second determined speed by applying the temperature sensed at the temperature sensing point in the function of speed versus temperature, and controlling the cooling fan operating under the second determined speed to cool said electronic apparatus.

6. The control method of claim 5, wherein the air filter substantially has a first structural density, the partial structure of the air filter neighboring the thermal sensor has a second structural density, and the second structural density is higher than the first structural density.

7. The control method of claim 5, wherein the air filter comprises a main body and a shield portion protruding from the main body, when the air filter is attached to the inlet of the casing, the main body is disposed at the inlet of the casing, and the shield portion of the air filter shields the temperature sensing point to block the airflow from flowing through the temperature sensing point.

8. The control method of claim 5, wherein the air filter comprises a mesh.

* * * * *